(12) United States Patent
Dixon

(10) Patent No.: US 6,351,340 B2
(45) Date of Patent: *Feb. 26, 2002

(54) AC ERASE SYSTEM AND METHOD FOR DATA STORAGE MEDIA

(75) Inventor: Glenn B. Dixon, West Point, UT (US)

(73) Assignee: Iomega Corporation, Roy, UT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,664

(22) Filed: Nov. 13, 1998

(51) Int. Cl.[7] .............................. G11B 5/03; G11B 5/09
(52) U.S. Cl. ........................................ 360/66; 360/46
(58) Field of Search ................................. 360/66, 46

(56) References Cited

U.S. PATENT DOCUMENTS

| | | | |
|---|---|---|---|
| 4,287,540 A | 9/1981 | Cheatham et al. | 360/18 |
| 4,412,141 A * | 10/1983 | Jacobsen | 307/471 |
| 4,786,991 A * | 11/1988 | Yamamori | 360/66 |
| 4,802,028 A | 1/1989 | Ohnaka | 360/66 |
| 4,956,728 A | 9/1990 | Hayata et al. | 360/66 |
| 5,053,893 A | 10/1991 | Hayata et al. | 360/66 |

* cited by examiner

Primary Examiner—Regina Y. Neal
(74) Attorney, Agent, or Firm—Woodcock Washburn LLP

(57) ABSTRACT

A system and method for AC erasing fields on tracks in a disk is provided. An AC three-pass write technique is used in a disk drive to erase old data from an older generation, wide track disk with a newer generation, narrower read/write head, and write new data to the wide track disk with the narrower head. A strong AC bias field (instead of a DC bias field) is applied to the read/write head during the erase passes in the multipass technique, thereby reducing the net signal-to-noise ratio when the written data is read back in an older drive with a wider head. Moreover, a request from a disk drive controller for a DC erase is detected and the DC erase signal is automatically replaced with an AC erase signal.

14 Claims, 3 Drawing Sheets

AC ERASE SYSTEM AND METHOD FOR DATA STORAGE MEDIA

FIELD OF THE INVENTION

The present invention relates in general to a method of and an apparatus for erasing a magnetic disk. More particularly, the present invention relates to a method of and a device for erasing a recording track formed on the magnetic disk.

BACKGROUND OF THE INVENTION

Signals representing data are generally recorded on magnetic recording media such as magnetic disks, magnetic tapes, or the like by residual magnetism. The data on disks is written by a read/write head located in a disk drive that writes the data in concentric circles on the disk called tracks. Disk drives with removable media preferably have the capability to read and write disks from earlier generation drives (i.e., older disks). These older disks typically have a lower capacity, and therefore have wider data tracks than the newer disks. For example, a 1.44 megabyte 3.5" floppy disk drive preferably has the capability to read and write older 750 kilobyte disks, which have substantially wider data tracks. In the older disk drives, wider read/write heads are used to read and write data to the tracks. As technology has improved and the density of data on disks has increased, read/write heads have become narrower. To be able to produce newer generation disk drives economically, the same read/write head is used to read and write both current (narrow track) and older generation (wide track) disks. Because the head's recording width matches the narrower track width of newer drives, special techniques must be used to correctly write a track on the wider tracks found in older generation disks.

FIG. 1 is a top view diagram of a wider track (from an older generation disk) that has been overwritten with a narrow head (in a later generation disk drive having a narrow head). Old data 110 along the edges of the track 101 remain after the new data 105 has been written. The narrow head writes new data on a track width WN. The wider head reads and writes data on a track width WW. The old data remaining after the narrow head writes on a track has a width of WO1 and WO2, where WW=WN+WO1+WO2. Typically, WO1 is substantially equal to WO2. The old data 110 will likely interfere with the desired signal (which comprises only the new data 105 and not the old data 110) if the disk is read in an older drive that is equipped with a wider read/write head. When the track 101 written by a narrow head is read back by a wide head (e.g., in an older drive), both the old data 110 remaining along the track edges and the new data 105 are read back.

One method of overcoming this problem is to utilize a second erase head in the newer drive. This head is not designed to record data, but instead is designed to simply erase the track edges of the older disk's track. In other words, the recorded signals or data can be erased by removing the residual magnetism under a magnetic field generated by an erasing head positioned closely to the magnetic recording medium. One conventional way for erasing the recorded magnetic signals is known as a DC (direct current) erase process which utilizes either an erasing head with a direct current flowing through its coil or an erasing head having a permanent magnet. Such an erasing head produces a magnetic field in a prescribed direction to magnetize the magnetic recording medium uniformly until it is magnetically saturated. The DC erasing head is however disadvantageous in that it leaves noises of high level on the magnetic recording tape when erasing the recorded signals therefrom, thus increasing the distortion rate of signal waveforms which will be recorded and reproduced.

Another method that does not use a separate erase head is to first erase the entire wide track of the older generation disk before writing the data. This technique, called "three-pass write" is performed in accordance with the top view diagrams shown in FIGS. 2A–2C. Here, the track 101 is first erased by doing two erase passes on the wide track with the narrower read/write head 120. On the first pass, as shown in FIG. 2A, old data 110 on one track edge 125 is erased by passing a DC erase current through the read/write head 120 while the head passes along track edge. On the second pass, as shown in FIG. 2B, the remaining edge 130 is erased. Finally, as shown in FIG. 2C, the new data signal 135 is written down the center of the wider track 101 by the narrower head 120. Thus, the new data 135 is not corrupted by the old data 110 when the track is read by a wider read/write head, for example, in an older generation disk drive.

One drawback of the above described downward compatibility techniques is that the actual signal written is narrower than what the earlier generation head writes. This causes the readback signal read by the wider head to be lower. Additionally, because DC erased media still generates some noise in a readback head, the erased track edges still contribute noise to the readback signal. The result is poor signal-to-noise ratio when an older generation drive reads a disk written by a newer generation drive.

Additionally, it has been found that the DC-magnetized edges of a wide track that has been DC erased and then written with a narrow head adversely affects the edges of the written flux changes by coupling flux to the edges of the written signal that have opposite polarity to the DC field. When read by a wide head, this coupling causes an undesirable effect known as pulse-pairing, where readback pulses of one polarity are shifted early in time, and those of the opposite polarity are shifted late. Thus, leaving DC erase fields on track edges when the track is written by a narrow head degrades both signal linearity and signal-to-noise ratio.

In both audio magnetic recording and in data recording, it is known that erasing the recording medium with a high-frequency AC (alternating current) signal instead of a DC erase field results in lower readback noise. This is because DC erased media is still strongly magnetized in one direction, and any flaws in the media's distribution of magnetic particles (caused by media defects, random magnetic particle fluctuations, particle clumping, and surface roughness) will result in an external magnetic field that is picked up by the system readback head as unwanted noise.

In a prior art AC erase technique, an erasing head having a coil is supplied with an alternating current for magnetizing the magnetic recording medium as it passes the erasing head. The magnetic recording media is magnetized until it is saturated. As the magnetic recording medium travels away from the AC erasing head, the recording medium is less subject to the alternating magnetic field produced by the AC erasing head, and hence the residual magnetism on the recording medium is progressively reduced, and any residual that remains on the disk is at a frequency above the recording bandwidth, which can be removed by appropriate low-pass filtering.

Thus, the DC magnetized media causes external fields in any anomalous regions including bit edges. By erasing with an AC signal whose frequency is substantially higher than any recorded data frequency, the media magnetization switches polarity over short readback spacings, and the perturbations mentioned above cause lower external fields. Because polarity shifts frequently with AC erase, externally generated fields are smaller. This results in lower unwanted readback noise. However, conventional AC erase systems are single pass.

Although the art of reading and writing data to disks is well developed, there remain some problems inherent in this technology, particularly the integrity of data written to and read from different generations of disks and disk drives having different size read/write heads. Therefore, a need exists for a system and method for erasing unwanted data that overcomes the drawbacks of the prior art.

SUMMARY OF THE INVENTION

The present invention is directed to a system for erasing a signal in a recording track formed on a magnetic disk comprising a magnetic head for at least erasing a first edge portion and a second edge portion of the magnetic disk, and an AC erase controller for sequentially generating a first AC erasing signal and a second AC erasing signal. The AC erase controller comprises a terminal for receiving an erase command signal, and the AC erase controller supplies the magnetic head with the erasing signals responsive to the erase command signal. The first AC erasing signal is for erasing the first edge portion and the second AC erasing signal is for erasing the second edge portion of the magnetic disk.

According to one aspect of the present invention, the first edge portion of the magnetic disk is opposite the second edge portion of the magnetic disk.

In accordance with an aspect of the present invention, the AC erase controller comprises a gate oscillator. Preferably, the gate oscillator comprises XOR gates.

In accordance with a further aspect of the present invention, the system further comprises a pulse detector for detecting the erase command signal and activating the AC erase controller responsive to the erase command signal.

In accordance with a further aspect of the present invention, the erase command signal is a DC erase command signal or an AC erase command signal.

According to further aspects of the invention, the first AC erasing signal has a first frequency and the second AC erasing signal has a second frequency. The first and second frequency are substantially equal, and preferably equal about 50 MHz.

In a further embodiment within the scope of the present invention, a method for erasing a signal in a recording track formed on a magnetic disk is provided. The method comprises the steps of erasing a first portion of the recording track by supplying through a magnetic head a first AC erasing signal, and erasing a second portion of the recording track by supplying through the magnetic head a second AC erasing signal. The first portion of the recording track is along one edge of the recording track and the second portion of the recording track is along the opposite edge of the recording track.

Another embodiment within the scope of this invention includes a method for erasing a signal in a recording track formed on a magnetic disk, comprising the steps of receiving an erase command signal at an AC erase controller, supplying a magnetic head with a first AC erasing signal responsive to the erase command signal, and supplying the magnetic head with a second AC erasing signal responsive to the erase command signal.

According to another aspect of the present invention, the method further comprises the steps of erasing a first portion of the recording track by supplying through the magnetic head the first AC erasing signal, and erasing a second portion of the recording track by supplying through the magnetic head the second AC erasing signal.

The foregoing and other aspects of the present invention will become apparent from the following detailed description of the invention when considered in conjunction with the accompanying drawings.

DESCRIPTION OF EXEMPLARY EMBODIMENTS AND BEST MODE

The present invention is directed to a system and method for AC erasing fields within tracks in a disk. An AC multiple-pass (e.g., three-pass) write technique is used in a disk drive to erase and write an older generation, wide track disk with a newer generation, narrower head. By applying a strong AC bias field (instead of a DC bias field) to the head during the erase passes (e.g., two erase passes in the three-pass technique as described in FIG. 2), a net signal-to-noise reduction is realized when the written data is read back in an older drive with a wider head. The reduction occurs because the AC-erased track edges generate less unwanted noise in the wider readback head. Thus, in the present invention, signal-to-noise is improved in a downward compatible mode on older disk drives. Moreover, the present invention detects the request for a DC erase and automatically replaces the DC erase signal with AC erase signal.

Figure 1:
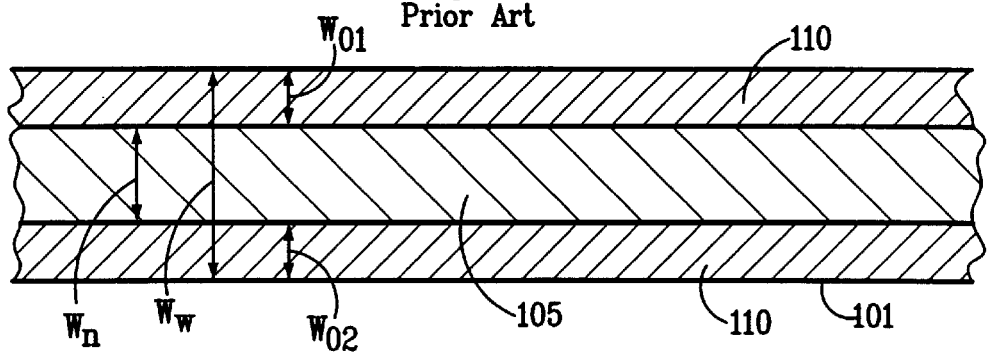
FIG. 1 (prior art) is a diagram of a wider track (from an older generation disk) that has been overwritten with a narrow head (in a later generation disk drive having a narrow head)
Figure 2A:
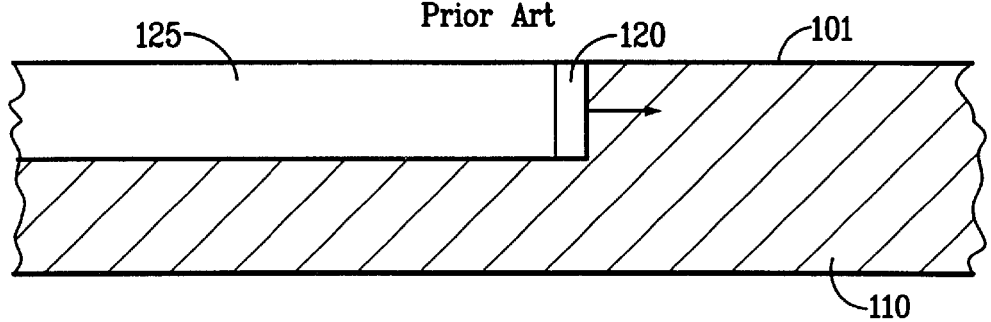
FIGS. 2A–2C (prior art) are diagrams showing various stages of a conventional DC three-pass write technique.
Figure 2B:
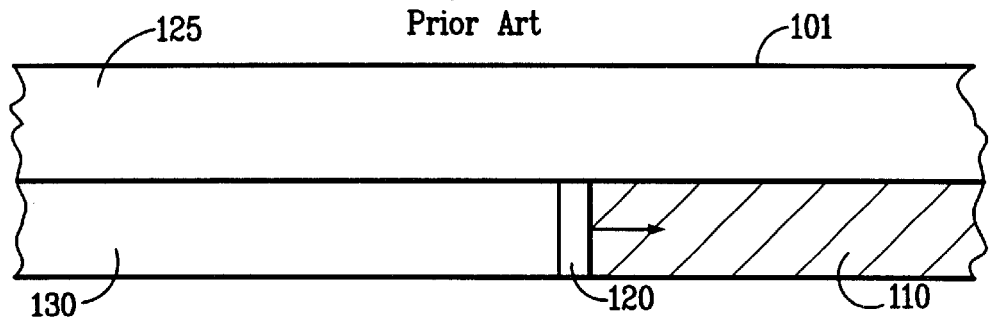
Figure 2C:
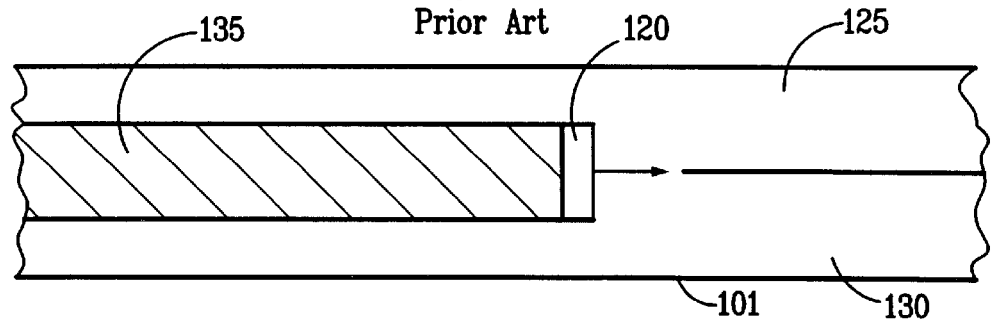

A multiple-pass write technique involves multiple passes of erasing, followed by a pass of writing. For example, from FIG. 2, a three-pass write technique involves two passes of erasing, followed by one pass of writing. However, FIG. 2 is described with respect to a DC erase, whereas the present invention is directed to AC erase.

Figure 3:
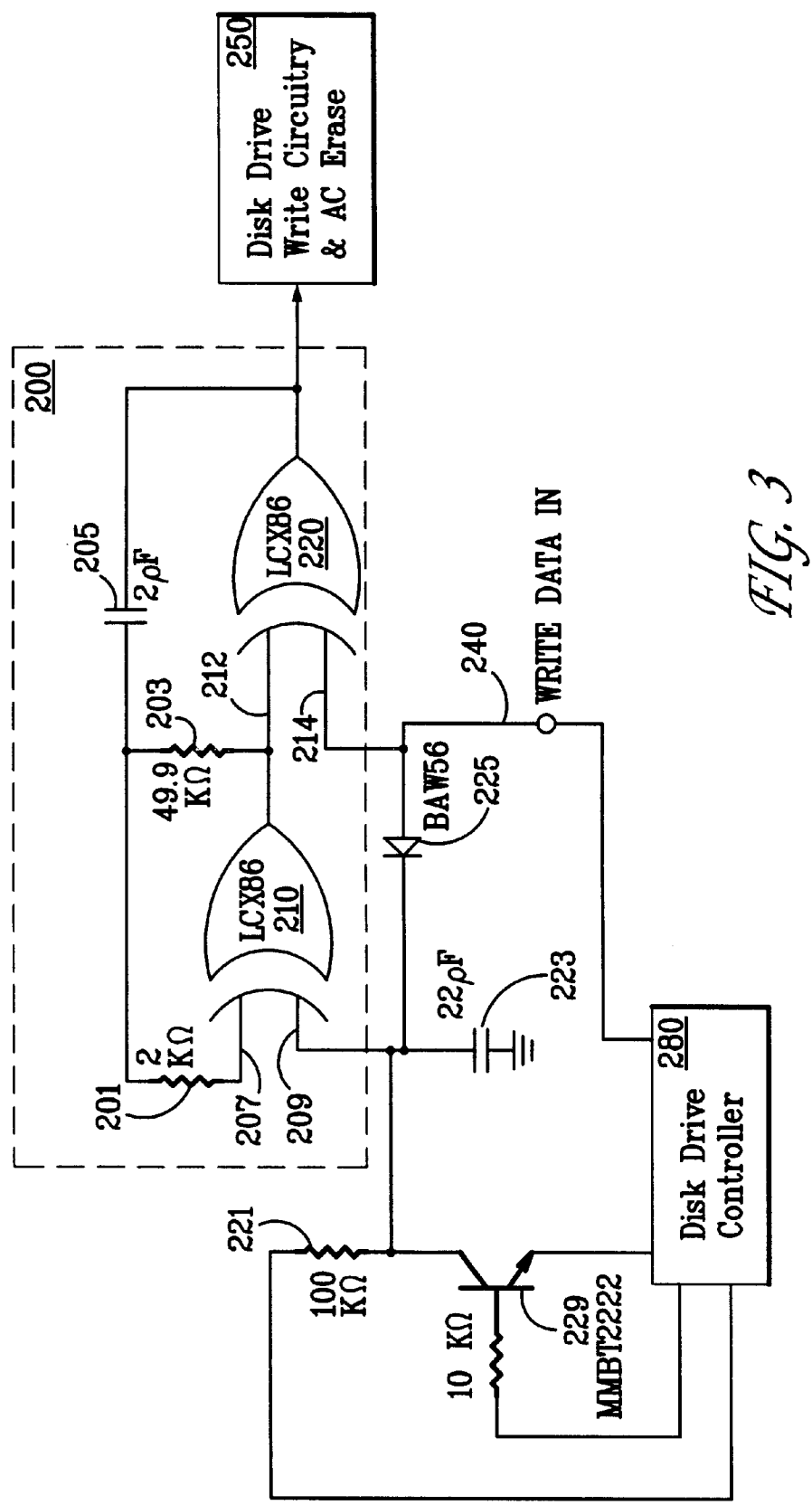
FIG. 3 is a schematic diagram of an exemplary AC erase system in accordance with the present invention.

FIG. 3 shows a schematic circuit diagram of an AC erase system in accordance with the present invention. The present invention includes an AC erase controller comprising a gate oscillator circuit 200, a pulse detector comprising a resistor 221, a capacitor 223, and a diode 225, and conventional AC erase circuitry to perform the AC erase as directed by the AC erase controller and pulse detector. The gate oscillator 200 comprises XOR (exclusive OR) gates 210, 220 to enable/disable the oscillator 200 yet still pass normal data pulses. Preferred component values and part numbers are shown.

Referring to FIG. 3, during an erase pass (which occurs prior to writing when a write has been ordered), a "write" signal that is provided from the disk drive controller 280 to terminal 240 goes active (e.g., low). The "write" signal from the controller 280 is used in a typical disk drive to order a disk drive write or a DC erase. During an erase pass, the write signal remains low, and there are no data pulses on the write data line (input 214 into the XOR gate 220). In conventional disk drives, the absence of data pulses is a DC erase. The no pulse condition is detected by the circuit formed by resistor 221, capacitor 223, and diode 225. After a predetermined time (related to the time constant formed by the components 221, 223, 225), the input 209 to the XOR gate 210 goes high. The gate oscillator 200 comprising gates 210, 220, and resistor 201, resistor 203, and capacitor 205 starts up. The XOR gate 210 acts as an inverter to input 207.

Resistors 201, 203 and a capacitor 205 provide a high-frequency AC erase signal (preferably about 50 MHz) to the disk write circuitry 250 through the XOR gate 220. Thus, the DC erase signal from the disk drive controller 280 is automatically replaced by an AC erase signal during the erase process. The AC erase that takes place in the disk write circuitry 250 along the edges of the track is conventional AC erase, as would be understood by those skilled in the art.

After the desired number of erases take place (e.g., two erase passes in a three-pass write technique), a conventional write is ordered by the disk drive controller. In accordance with the present invention, the writing is conventional; i.e., writing takes place as in a conventional disk drive. In FIG. 3, a "write" signal is provided from the disk drive controller 280 to the terminal 240. The "write" signal is used to indicate when writing is taking place on the disk. During writing, the "write" data signal is high, and provides a low-going pulse at the substantially precise instant a flux change is to be written to the disk by the recording head. During a normal data write, data pulses are provided to the XOR gate 220 via the input 214 and to the disk drive write circuitry 250 unaltered, or possibly inverted, depending on the state of XOR input 212. The disk drive write circuitry is not affected by the write pulse polarity. As long as data pulses are present in the write data signal, the input 209 to the XOR gate 210 is held low by diode 225 connected to the write data terminal 240. This has the effect of turning off the gate oscillator 200 comprising gates 210, 200 and resistor 201, resistor 203, and capacitor 205. Thus, the input 212 to gate 220 does not toggle during data writes, and a conventional writes occurs.

The time constants formed by the resistor 221 and the capacitor 223 are chosen so that the oscillator 200 starts sufficiently quickly when an erase is ordered by the disk drive controller 280, and still prevents the AC erase oscillator 200 from starting during a normal data write. The AC erase frequency is determined primarily by two factors: it is preferably high enough so that no significant interaction occurs between the harmonics of data signals and the AC erase frequency, yet low enough that the recording head and associated write circuitry can write the signal to the disk. Preferably, the AC erase frequency is about 50 MHz.

A transistor 229 is used as a switch to ensure that the AC erase oscillator 200 is off when the drive is not writing (i.e., erasing and then writing). The present invention provides approximately a 2 dB signal/noise improvement on a typical disk drive.

Figure 4:
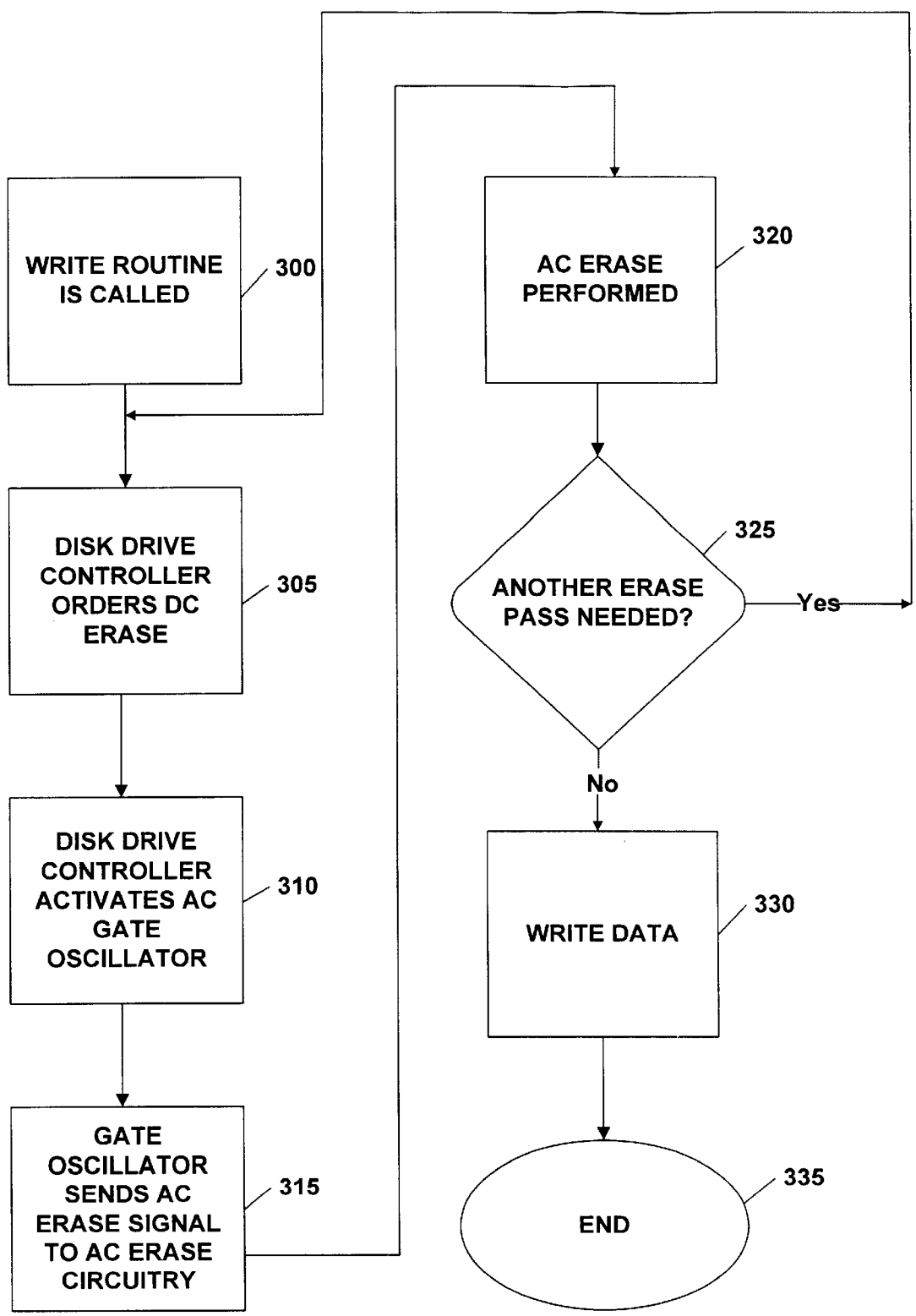
FIG. 4 is a flowchart of an exemplary method of operation in accordance with the present invention.

FIG. 4 is a flowchart of an exemplary method of operation in accordance with the present invention. A disk write routine is called at step 300. The track that data is being written to is desirably erased prior to being written on. At step 305, the disk drive controller orders an erase (a DC erase is shown), which activates the AC gate oscillator, as described above with respect to FIG. 3, at step 310. The gate oscillator sends an appropriate AC erase signal to AC erase circuitry in the disk drive at step 315. The AC erase is performed at step 320. It is then determined if another erase pass is desired, at step 325, for example, to further erase the track. If another erase pass is desired, processing returns to step 305. If another erase pass is not desired, then data is written to the disk at step 330 and the routine ends at step 335.

Thus, in accordance with the present invention, a circuit receives signals ordering a DC three-pass write, and then shuts off the DC erase portion, and instead activates an AC three-pass write. The combination of an active write enable and no data pulses on the write data line (input 214 into the XOR gate 220) within a certain period of time (depending on the drive, etc.) indicates to the circuit that a DC erase is in progress. The circuit responds by starting the oscillator 200 and substituting an AC erase signal in place of the DC signal. This happens quickly enough so that the data area of the disk is fully AC erased.

An advantage of the circuit of the present invention is that it can be easily installed in a disk drive originally outfitted to perform DC erase only. The circuit automatically detects the DC erase condition and substitutes an AC erase signal in its place. Data writes pass through the circuit with no effect. The circuit can then be implemented in a drive that is already outfitted for DC erase without having to have an extra control line to signal when AC erase is desired. The circuit also uses a small number of parts resulting in a low cost, easily implemented device. Furthermore, the present invention eliminates the undesirable pulse-pairing effect which degrades the time position of the bits depending on their polarity, as described above.

It should be noted that although the present invention has been described with respect to a disk drive which orders a DC erase signal, the present invention can be implemented in a disk drive that does not order a DC erase signal, but instead orders an AC erase signal.

It should be further noted that although the above described embodiment is directed to a three-pass writing technique (two erases followed by one write, similar to that described above with respect to FIG. 2), any number of erase and writing passes can be used in accordance with the present invention.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A system for multiple-pass erasing a signal in a recording track formed on a magnetic disk comprising:

a magnetic head for at least erasing a first edge portion and a second edge portion of the magnetic disk; and an AC erase controller for sequentially generating a first AC erasing signal and a second AC erasing signal, said AC erase controller comprising a terminal for receiving a DC erase command signal, said AC erase controller supplying said magnetic head with said erasing signals responsive to said DC erase command signal, said first AC erasing signal for erasing said first edge portion and said second AC erasing signal for erasing said second edge portion of the magnetic disk after said first edge portion has been erased, thereby resulting in multiple erase passes.

2. The system according to claim 1, wherein said first edge portion of the magnetic disk is opposite said second edge portion of the magnetic disk.

3. The system according to claim 1, wherein said AC erase controller comprises a gate oscillator.

4. The system according to claim 3, wherein said gate oscillator comprises a plurality of XOR gates.

5. The system according to claim 1, further comprising a pulse detector for detecting said DC erase command signal and activating said AC erase controller responsive to said DC erase command signal.

6. The system according to claim 1, wherein said first AC erasing signal has a first frequency and said second AC erasing signal has a second frequency, said first and second frequency being substantially equal.

7. The system according to claim 6, wherein said first and second frequency are approximately 50 MHz.

8. A method for multiple-pass erasing a signal in a recording track formed on a magnetic disk, comprising the steps of:

detecting a DC erase command signal;

erasing a first portion of the recording track by supplying through a magnetic head a first AC erasing signal responsive to the DC erase command signal; and erasing a second portion of the recording track by supplying through said magnetic head a second AC erasing signal after erasing said first portion, wherein the first portion of the recording track is along one edge of the recording track and the second portion of the recording track is along the opposite edge of the recording track.

9. The method according to claim 8, wherein said first AC erasing signal has a first frequency and said second AC erasing signal has a second frequency, said first and second frequency being substantially equal.

10. The method according to claim 9, wherein said first and second frequency are approximately 50 MHz.

11. A method for multiple-pass erasing a signal in a recording track formed on a magnetic disk, comprising the steps of:

receiving a DC erase command signal at an AC erase controller;

supplying a magnetic head with a first AC erasing signal responsive to said DC erase command signal; and supplying a magnetic head with a second AC erasing signal responsive to said DC erase command signal after supplying said first AC erasing signal.

12. The method according to claim 11, further comprising the steps of:

erasing a first portion of the recording track by supplying through said magnetic head said first AC erasing signal; and erasing a second portion of the recording track by supplying through said magnetic head said second AC erasing signal.

13. The method according to claim 11, wherein said first AC erasing signal has a first frequency and said second AC erasing signal has a second frequency, said first and second frequency being substantially equal.

14. The method according to claim 13, wherein said first and second frequency are approximately 50 MHz.

* * * * *